United States Patent
Lohr et al.

(10) Patent No.: US 6,860,295 B2
(45) Date of Patent: Mar. 1, 2005

(54) VARIABLE RATE DISPENSING APPARATUS

(75) Inventors: James H. Lohr, Union Grove, WI (US); James L. Bournoville, Racine, WI (US); John A. Boticki, Racine, WI (US)

(73) Assignee: JohnsonDiversey, Inc., Sturtevant, WI (US)

( * ) Notice: Subject to any disclaimer, the term of this patent is extended or adjusted under 35 U.S.C. 154(b) by 111 days.

(21) Appl. No.: 10/065,308

(22) Filed: Oct. 2, 2002

(65) Prior Publication Data

US 2004/0065373 A1 Apr. 8, 2004

(51) Int. Cl.[7] .................................................. F04F 5/00
(52) U.S. Cl. ...................... 137/893; 251/251
(58) Field of Search ..................... 137/893; 251/251, 251/252

(56) References Cited

U.S. PATENT DOCUMENTS

| | | | |
|---|---|---|---|
| 460,728 A | * 10/1891 | Sandlass | ..................... 251/252 |
| 824,527 A | 6/1906 | Colina | |
| 938,601 A | 11/1909 | Maas | |
| 1,066,820 A | * 7/1913 | Kelly | ........................... 251/252 |
| 1,423,966 A | 7/1922 | Palmaffy | |
| 1,590,818 A | 6/1926 | Gehbauer | |
| 3,127,786 A | 4/1964 | Wooley | ....................... 74/527 |
| 3,333,601 A | 8/1967 | Lofgreen | .................... 137/604 |
| 3,396,939 A | 8/1968 | Hettich | ....................... 251/253 |

FOREIGN PATENT DOCUMENTS

| | | | | |
|---|---|---|---|---|
| GB | 402739 | | 3/1932 | |
| GB | 475327 | | 11/1937 | |
| GB | 643763 | * | 9/1950 | ................. 137/893 |
| GB | 2188399 A | | 9/1987 | ......... F16K/31/528 |
| JP | 57-101184 | * | 6/1982 | ................. 251/251 |

* cited by examiner

Primary Examiner—Stephen M. Hepperle
(74) Attorney, Agent, or Firm—Neil E. Hamilton; Warren R. Boyee; Renee J. Rymarz

(57) ABSTRACT

A mixing and dispensing apparatus wherein a liquid concentrate is metered into a diluent stream of an eductor in a precise manner. A needle valve is employed in conjunction with a cam member and the cam member includes slopes of varying degrees. In this manner, a wide range of dilution rates can be accomplished with only a single revolution of the needle valve. The apparatus is particularly useful in mixing and dispensing chemical concentrates such as cleaning and sanitizing materials.

10 Claims, 5 Drawing Sheets

VARIABLE RATE DISPENSING APPARATUS

BACKGROUND OF INVENTION

1. Technical Field

This invention relates generally to liquid mixing and dispensing apparatus and more particularly, to such an apparatus wherein the mixing is conducted at a variable rate and in a precise manner.

2. Background Art

Mixing and dispensing apparatus of the type which mix a chemical cleaning or sanitizing concentrate with water are well known. The resulting solutions can be filled into suitable containers such as bottles or buckets. They can also be sprayed from the dispensing apparatus. Apparatus of this type are available from Johnson Diversey of Sturtevant, Wis. as the J-FILL dispensing units or Solution Centers.

While the previously referred to units afford accurate, reliable and dispensing of solutions, the metering of the concentrate into the diluent water can be a problem. In many instances the metering is accomplished by providing two different concentrate bottles or metering devices placed in the bottle for the concentrate. Accordingly, it would be desirable to be able to vary the amount of concentrate incrementally without the use of different concentrate bottles or metering devices and do so in a precise and efficient manner.

Various types of metering valves are available. For example, in U.S. Pat. No. 938,601 a needle valve is disclosed in conjunction with a camming surface. The needle valve is intended for use with a Bunsen burner. U.S. Pat. No. 824,527 also discloses a needle valve in conjunction with a valve slide having an inclined hole. This valve also is intended for use with gas burners. A faucet type valve with a camming surface is disclosed in U.S. Pat. No. 1,423,966.

The prior art does not disclose a needle valve for use with a mixing and dispensing apparatus which can precisely measure the amount of concentrate into a diluent stream of water.

The objects of the invention therefore are:

a. Providing an improved liquid and dispensing apparatus.

b. Providing a liquid mixing and dispensing apparatus which allows for a precise metering of diluent.

c. Providing a liquid mixing and dispensing apparatus wherein the precise metering of diluent is accomplished in an efficient manner.

d. Providing a liquid mixing and dispensing apparatus wherein the precise metering of diluent is accomplished over a wide range of dilution rates.

e. Providing a liquid mixing and dispensing apparatus of the foregoing type wherein the precise metering of diluent is accomplished by a single rotation of a needle valve.

f. Providing a liquid metering apparatus which can be retrofitted to a liquid mixing and dispensing apparatus.

SUMMARY OF INVENTION

The foregoing objects are accomplished and the shortcomings of the prior art are accomplished by the precision variable rate dispensing apparatus of this invention which includes a support member and an eductor connected to the support member. The eductor has a liquid inlet, an inlet for liquid concentrate and an outlet for a mixed solution. A needle valve assembly is in fluid communication with the inlet for liquid concentrate, the needle valve assembly including a valve body, and a needle member for reciprocal movement with respect to a passage to vary flow therethrough. A cam follower portion is connected to the needle member and a cam member is positioned between the cam follower portion and the passage. The needle member is constructed and arranged so that when the needle member is turned in one direction with the cam follower portion in contact with the cam member, the needle member will move away from the passage to increase flow through the valve and when the needle portion is turned in the opposite direction the needle member will move in the direction of the passage to reduce flow through the valve.

In one aspect, the cam member is constructed and arranged so that a single revolution of the needle portion will cause a full operation of the valve.

In a preferred embodiment, the cam member has a cam surface with a first degree slope and a rapidly increasing slope larger than the first, with the rapidly increasing slope of the cam surface terminating in an end wall connected to the first degree slope.

In another aspect, the cam follower member is defined by a flange member extending from the needle portion.

In another embodiment, the cam member is defined by a one piece, ramped, annular component.

In yet another embodiment, the valve body is connected to the eductor at one end of the eductor and the inlet for liquid concentrate is connected to a side of the valve body.

These and still other objects and advantages of the invention will be apparent from the description which follows. In the detailed description below a preferred embodiment of the invention will be described in reference to the full scope of the invention. Rather, the invention may be employed in other embodiments.

DETAILED DESCRIPTION

Figure 1:
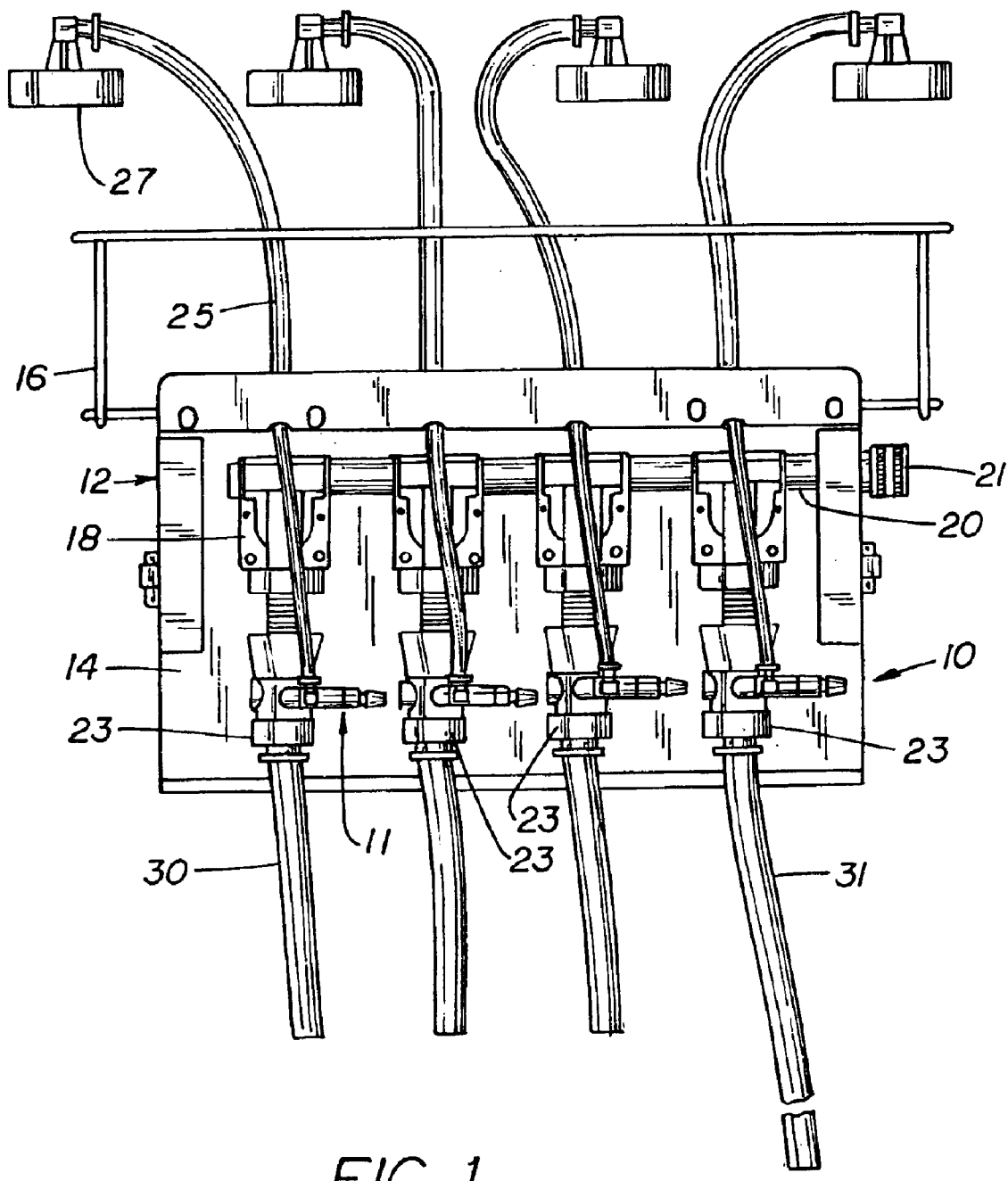
FIG. 1 is a back view of a multi-station liquid mixing and dispensing apparatus utilizing the valve assembly of this invention.

Referring to FIG. 1, the variable rate dispensing apparatus generally 10 includes a needle valve assembly generally 11 in conjunction with a dispensing apparatus generally 12. Dispensing apparatus 12 without the needle valve assembly 111 is commercially available from Johnson Diversey of Sturtevant, Wis. as Solutions Center Chemicals. It includes a housing member 14 and a rack member 16 for bottles (not shown) of chemical concentrate. There are four valve bodies 18 connected to the housing member. Valve bodies include valves at the opposite side which can control the flow of water therethrough. A supply line 20 is interconnected to the valve bodies which will transport water to the valve bodies 18. A hose connection 21 is connected to the supply line 20. The dispensing apparatus 12 also includes the eductors 23 to which are connected liquid supply lines 25, the supply lines terminating in the caps 27 for connection to bottles of chemical concentrate. When diluent water flows through the supply line 20, chemical concentrate is siphoned through the liquid supply lines 25 and into the eductors 23 where it is mixed into a mixed solution flowing out of the outlet lines 30 and 31. A preferred eductor is described in U.S. Pat. No. 5,927,338 assigned to Johnson Diversey, Inc.

Figure 3:
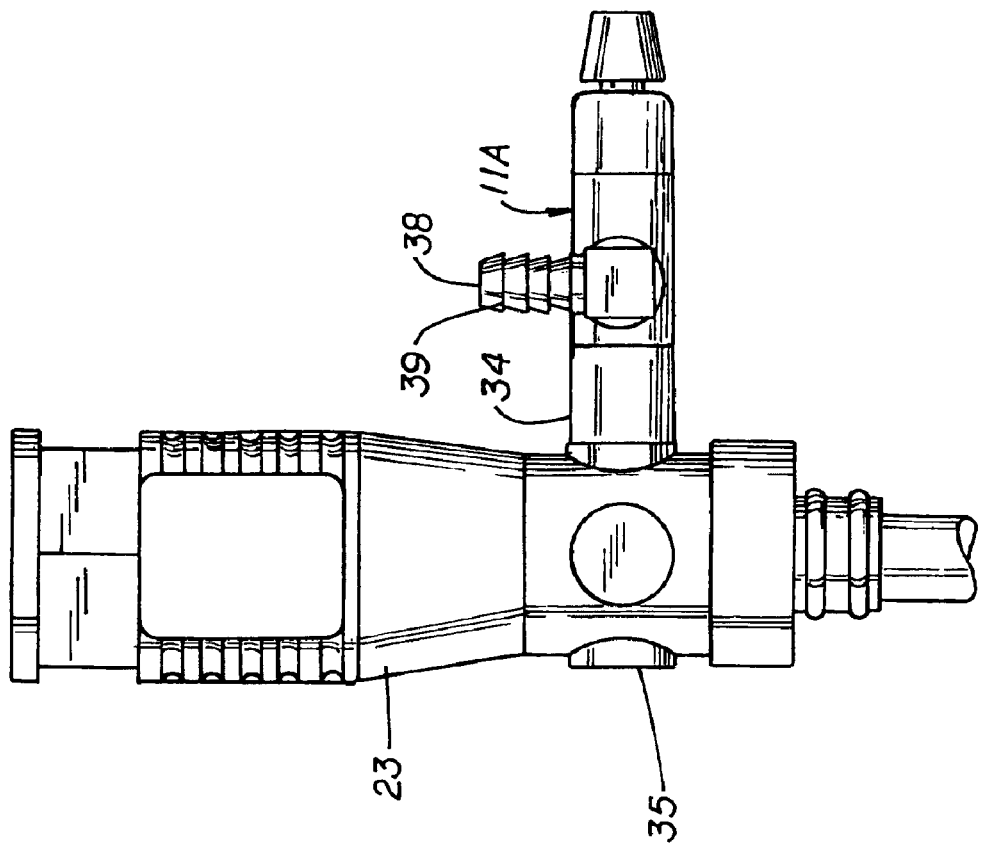
FIG. 3 is a view similar to FIG. 2 showing another embodiment of the valve assembly.
Figure 2:
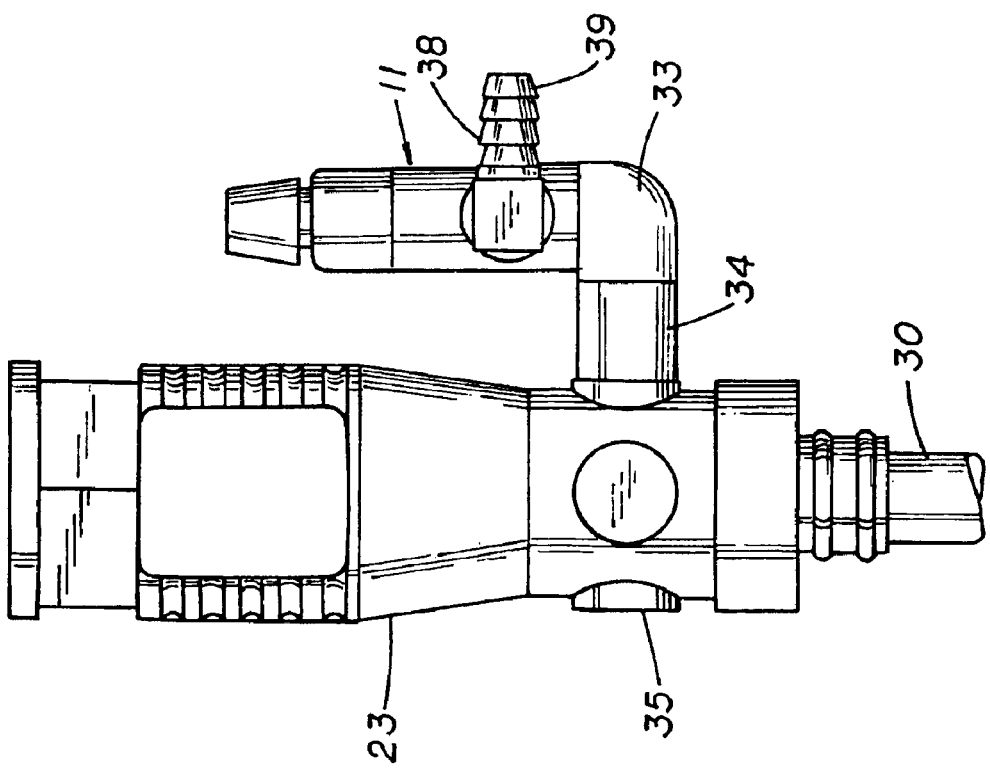
FIG. 2 is an elevational view showing one embodiment of the valve assembly.
Figure 10:
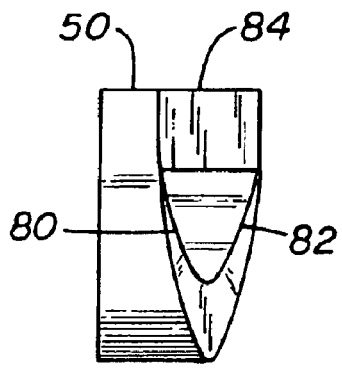
FIG. 10 is a side view of the cam member opposite that of FIG. 8.
Figure 11:
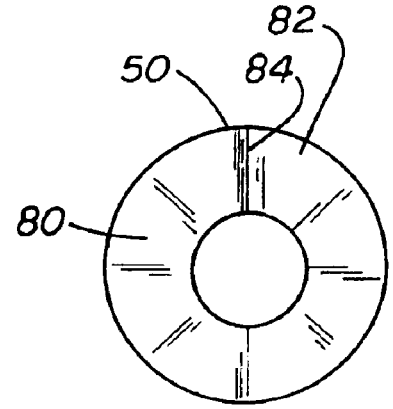
FIG. 11 is a top view of the cam member.
Figure 12:
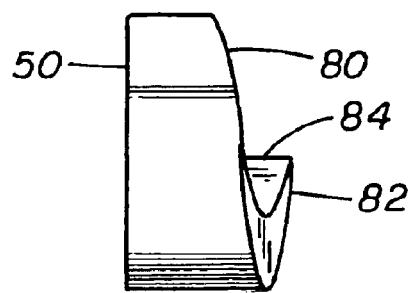
FIG. 12 is another end view of the cam member.

Referring to FIGS. 2 and 3, there are shown two embodiments of the valve assembly 11 and 11A. The basic difference between the two embodiments is that the FIG. 10 embodiment includes an elbow 33 with a parallel connection to the eductors 23 whereas the embodiment in FIG. 10A includes a transverse connection. Both embodiments are connected to the eductors through the conduits 34 and 35. In both instances, the valve body 32 is interconnected to the eductor 23 at one end of the eductor and the inlet 38 for liquid concentrate is connected to a side of the valve body.

Figure 4:
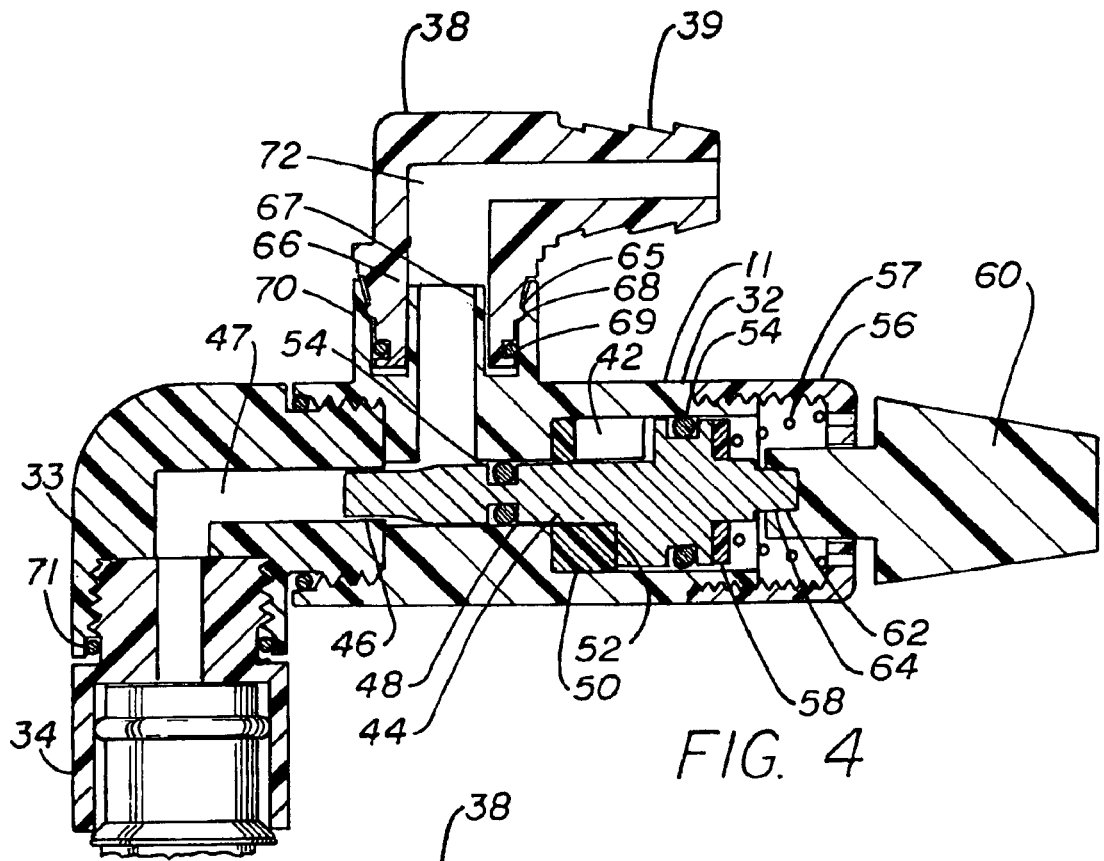
FIG. 4 is a sectional view and the valve assembly shown in FIG. 2.
Figure 6:
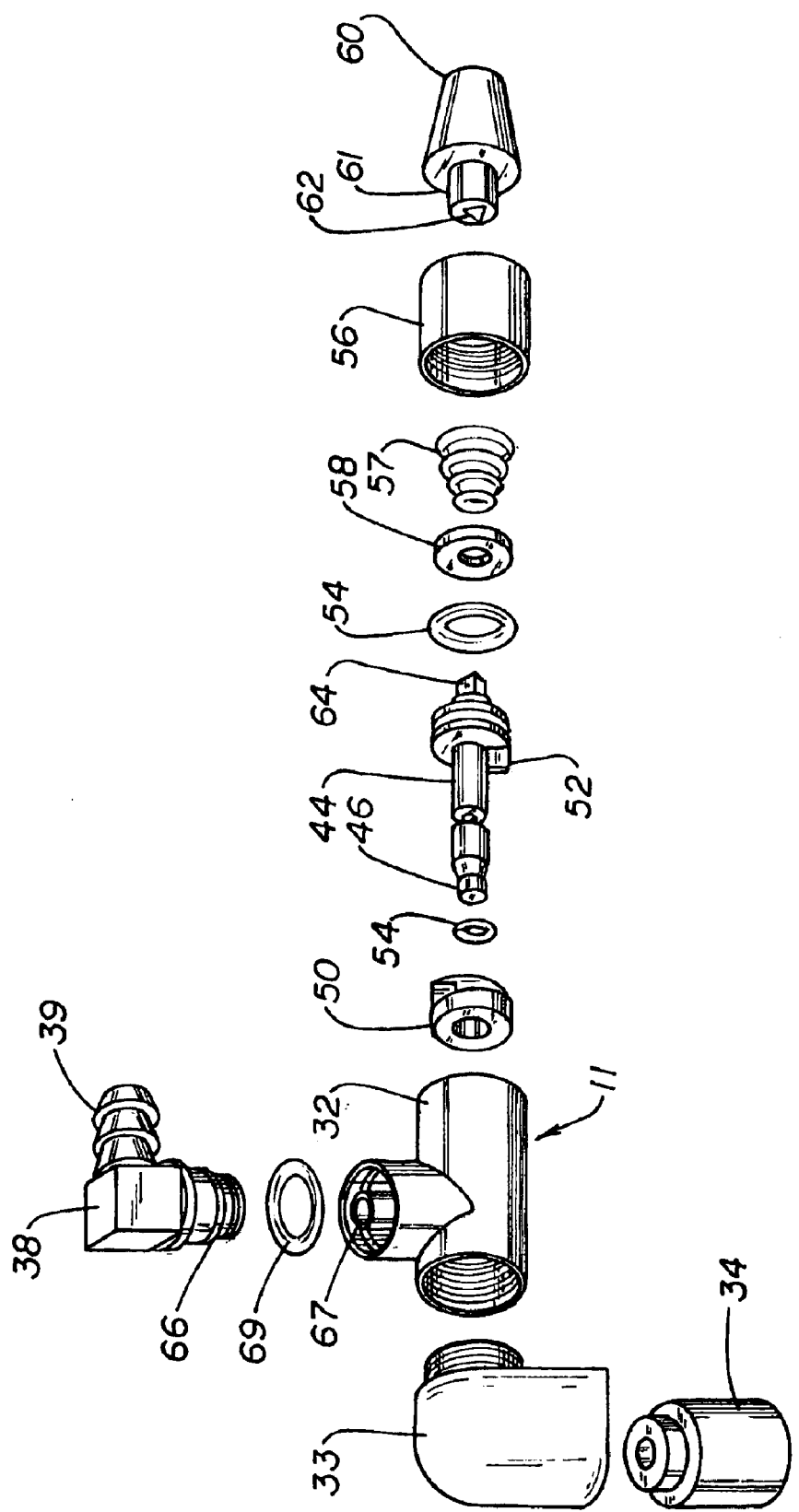
FIG. 6 is an exploded view of the valve assembly shown in FIG. 2.
Figure 7:
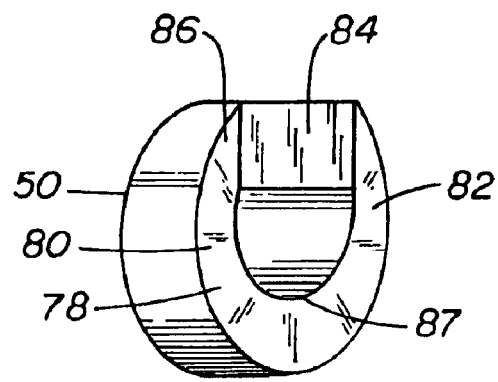
FIG. 7 is a perspective view of a cam member utilized in the valve assembly.
Figure 8:
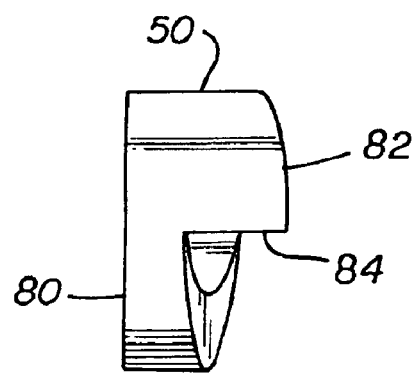
FIG. 8 is a side view of the cam member.
Figure 9:
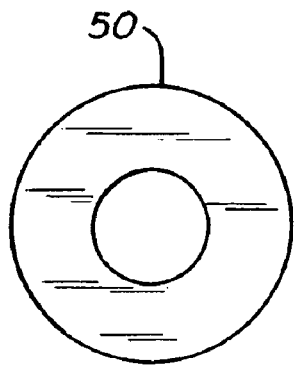
FIG. 9 is a bottom view of the cam member.

Referring to FIGS. 4 and 6, the valve assembly 11 include a valve body 32 to which is attached an intake nozzle member 38 having a barbed section 39 to provide a fluid tight connection of line 25. Valve body 32 has a component 42 in which is positioned a needle member 44 having a nose section 46 extending therefrom and into passage 47. Also disposed in compartment 42 is a cam member 50. There are appropriate seals 54 to seal the needle member 44 against the inner wall of the compartment 42 as well as against the passage 48. There is a cam follower portion 52 in the form of a flange member connected to the needle member for riding against a cam surface of cam member 50. Cap 56 closes the compartment 42 and confines the spring 57 to bias it against the contact washer 58 on the needle member 44. A dial member 60 has a reduced section 61 which extends through the cap 56 and has a cut-out 62 for accommodating connector portion 64 of the needle member 44.

As also seen in FIG. 4, the intake nozzle member 38 is connected to valve body 32 by means of the extension 66 disposed between upstanding wall 70 and tubular portion 67. Extension 66 has a rib 65 for pivotal attachment in the groove 68 in the upstanding wall 70. A seal 69 affords sealing engagement between the intake nozzle member 38 and the wall 70. A seal 71 is also provided between conduit 34 and elbow 33.

Figure 5:
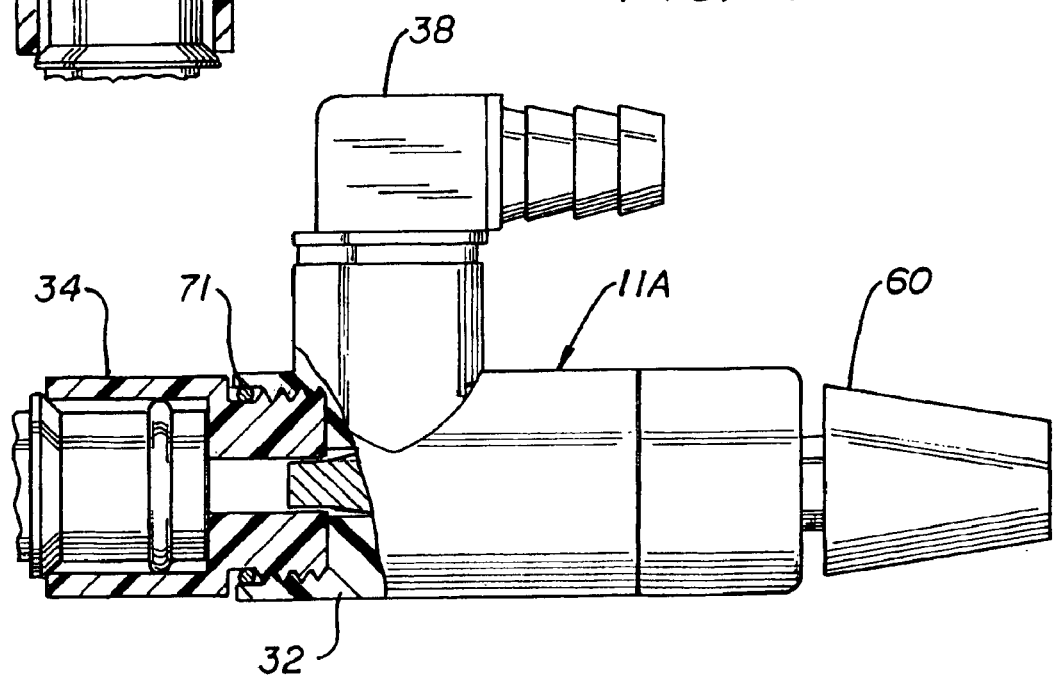
FIG. 5 is a partial sectional view of the valve assembly shown in FIG. 3.

FIG. 5 further illustrates valve assembly 11A. It has the same components as valve assembly 11 except for the elimination of elbow conduit 33. Conduit 34 is connected to valve body 32 and a seal is provided at 71.

The cam member 50 is more particularly described in FIGS. 7–12. It includes a one piece, ramped, annular component with a cam track 78 having a first degree slope 80 and a rapidly increasing slope 82. The first degree slope 80 has a slope in the range of 4° to 8°, whereas the second slope 82 is much larger and is in the range of 8° to 20° A wall 84 connects the first and second degree slopes. An important feature of the invention is the utilization of the two different slopes in the cam track 78 of the needle valve assembly 11 which affords the precision and quick adjustment in the variable rate dispensing apparatus 10. The small slope 80 on the first 180° of the cam track 78 can allow for dilution rates in the range of 1:512 to 1:256 while the rapidly increasing slope 82 allows for an exponential area changes in the 1:256 to 1:8 range. The 1:512 ratio rate provides a dilution of ¼ oz/gallon whereas the 1:256 ratio rate provides a dilution of ½ oz/gallon. This is a difference of ¼ oz/gallon for the first 180° slope 80. The final 180° slope 82 provides a dilution of 16 oz/gallon and a difference of 15¾ oz/gallon between the slopes. This wide range of dilution is effected in one revolution turn of the needle. It should be pointed out that the first degree slope is accomplished within 180° of the cam track whereas the larger degree within the final 180°. The first degree slope is indicated between the slope end points 86 and 87 in FIG. 7.

It should be understood that spring pressure holds the cam follower portion 52 in any given position. Nothing stops complete rotation of dial member 60. If the dial member 60 and cam follower portion 52 are turned too far, it resets back to start after it falls off ramp 82 and along wall 84 with spring 57 pushing back.

Referring back to FIG. 4, an increase or decrease in flow through the valves 11 and 11A is effected by a turning dial member 60. Accordingly, needle member 44 and the nose section 46 move toward and away from passage 47 to regulate the flow of concentrate from the passage 72 and ultimately to the eductor 23 through the conduit 34.

It will thus be seen that there is now provided a precise and variable valve assembly for a dispensing apparatus which provides a wide range of dilutions for a chemical concentrate. This is effected in a rapid manner in that only one revolution of the needle valve dial is required. The needle valve assembly can accommodate a wide variety of various chemical concentrates such as cleaners, sanitizers, strippers and disinfectants.

While the variable rate dispensing assembly has been described for use in conjunction with several eductors in a dispensing apparatus, it is obvious that it can be employed with only a single eductor. Further, while a single, larger outlet hose is shown at 31 for filling buckets, it is obvious that more than one could be utilized in place of the shorter hoses 30. All such and other modifications within the spirit of the invention are meant to be within its scope as defined by the appended claims.

What is claimed is:

1. A precision variable rate dispensing apparatus comprising:
   a support member;
   an eductor connected to the support member, the eductor having a inlet, an inlet for liquid concentrate and an outlet for a mixed solution;
   a needle valve assembly in fluid communication with the inlet for liquid concentrate, the needle valve assembly including a valve body, a needle member or reciprocal movement with respect to a passage to vary flow therethrough;
   a cam follower portion connected to the needle member;
   a cam member positioned between the cam follower member and the passage, the cam member having a cam surface with a first degree slope and a rapidly increasing second degree slope;
   the cam member and cam follower portion constructed and arranged so that when the needle member is turned in one direction, with the cam follower portion contracting the cam member, the valve will increase flow therethrough and when the needle member is turned in the opposite direction the valve will decrease flow therethrough.

2. The dispensing apparatus as defined in claim 1 wherein the cam member is constructed and arranged so that a single revolution of the needle portion will cause a full operation of the valve.

3. The dispensing apparatus as defined in claim 1 wherein the cam follower is defined by a flange member extending from the needle member.

4. The dispensing apparatus as defined in claim 1 wherein the needle valve assembly is positioned is in a parallel manner with respect to the eductor.

5. The dispensing apparatus as defined in claim 1 wherein the needle valve assembly is positioned in a perpendicular manner with respect to the eductor.

6. The dispensing apparatus as defined in claim 1 wherein a dial member is connected to the needle member outside of the valve body.

7. The dispensing apparatus as defined in claim 1 wherein the valve body is interconnected to the eductor at one end of the eductor and the inlet for liquid concentrate to a side of the valve body.

8. The dispensing apparatus as defined in claim 1 wherein the cam member is defined by a one piece, ramped, annular component.

9. The dispensing apparatus as defined in claim 1 wherein the second degree slope of the cam surface terminates in an end wall connected to the first degree slope.

10. The dispensing apparatus as defined in claim 1 wherein the cam member and cam follower portion are constructed and arranged to reset the cam follower portion upon complete rotation of the dial member.

* * * * *

UNITED STATES PATENT AND TRADEMARK OFFICE
CERTIFICATE OF CORRECTION

PATENT NO. : 6,860,295 B2
DATED : March 1, 2005
INVENTOR(S) : James H. Lohr et al.

It is certified that error appears in the above-identified patent and that said Letters Patent is hereby corrected as shown below:

Column 4,
Line 50, insert -- liquid -- between "a" and "inlet".
Line 54, replace "or" with -- for --.
Lines 64-65, replace "contracting" with -- contacting --.

Signed and Sealed this

Twenty-fifth Day of October, 2005

JON W. DUDAS
*Director of the United States Patent and Trademark Office*